S. P. TOWNSEND.
GREASE GUN.
APPLICATION FILED JUNE 12, 1908.
971,939.
Patented Oct. 4, 1910.
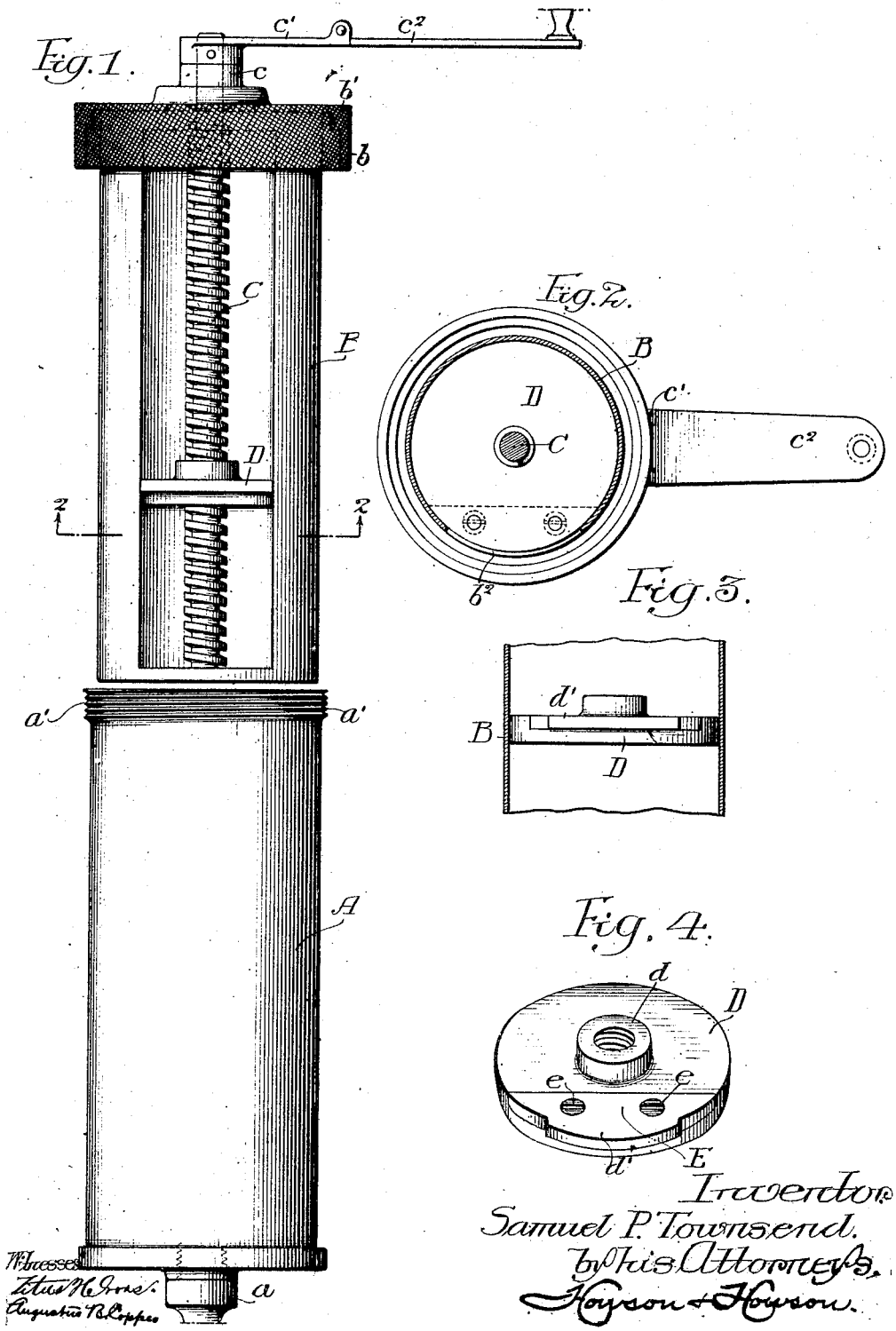
Inventor
Samuel P. Townsend.
by his Attorneys
Howson & Howson.

UNITED STATES PATENT OFFICE.

SAMUEL P. TOWNSEND, OF ORANGE, NEW JERSEY.

GREASE-GUN.

971,939.   Specification of Letters Patent.   Patented Oct. 4, 1910.

Application filed June 12, 1908. Serial No. 438,154.

*To all whom it may concern:*

Be it known that I, SAMUEL P. TOWNSEND, a citizen of the United States, residing in Orange, New Jersey, have invented certain Improvements in Grease-Guns, of which the following is a specification.

One object of my invention is to provide a portable device particularly designed for use in applying a semi-liquid or solid lubricant to the otherwise inaccessible parts of machinery, and particularly to that class of machinery found on motor vehicles.

Another object of the invention is to provide a portable device whereby solid lubricant may be forcibly injected into such parts of a machine as require the same; the construction of the device being such that it may be filled with lubricant and operated with little or no loss or escape of the same.

I further desire to provide a hand operated pump or syringe particularly adapted for use of solid lubricant, and which shall be of such a nature that its plunger, while longitudinally movable within its cylinder, shall be kept from turning as it is moved forward.

I also desire to provide a device of the general character above noted which shall be of a substantial construction and relatively inexpensive to manufacture.

These objects and other advantageous ends I secure as hereinafter set forth, reference being had to the accompanying drawings, in which:—

Figure 1, is a side elevation of my grease gun, showing its two principal parts as slightly separated; Fig. 2, is an inverted horizontal section taken on the line 2—2, Fig. 1; Fig. 3, is a vertical section of a part of the inner cylinder of the device, showing the piston in position therein; and Fig. 4, is a perspective view of the piston, illustrating its detail construction.

In the above drawings A represents a metallic cylinder closed at one end and having mounted in said end a nozzle $a$ of any desired shape and length. The opposite end of this cylinder is threaded, preferably on its exterior surface, as indicated at $a'$, and fits into a correspondingly threaded portion $b'$ of a cap or head $b$ of a second cylinder B; said second cylinder being of smaller diameter than the first and of such a diameter as to closely fit within the same. The length of said two cylinders is substantially equal and a portion of the cylinder B is cut away as indicated at $b^2$ to form an opening which extends practically the entire length of the cylinder and in the present instance has a width somewhat less than the diameter of said cylinder. The cap $b'$ is so fixed to the inner cylinder B as to extend over the same, being flanged as shown to form an annular recess for the reception of the threaded end $a'$ of the outer cylinder A. Said cap has its exterior surface milled or otherwise roughened as indicated to provide a hand hold when it is desired to screw together the two cylinders. A screw C passes centrally through a boss $c$ of the head or cover $b$ and is free to turn, while being held from longitudinal movement. To the extreme outer end of this screw is pinned or otherwise fixed a crank handle made in two parts $c'$ and $c^2$, hinged together so that the part $c^2$ may be folded over the part $c'$, when the device is not in use, so that it does not project appreciably beyond the sides of the cylinders.

Mounted upon the screw C is a piston or plunger D having its hub $d$ provided with a threaded passage in which said screw fits. The piston in turn closely fits the interior of the cylinder B and is provided with a projecting portion $d'$ which fits into the opening $b^2$ in the side of the said cylinder B. The amount of the projection of the part $d'$ is such that it not only fits the opening $b^2$, as above noted, but extends practically into engagement with the inner surface of the cylinder A so that the piston D prevents the passage of material from one of its sides to the other. While said piston may be constructed in a number of ways, I preferably recess a portion of one of its faces as illustrated in Fig. 4, and place therein a segmental plate E, having a projecting edge $d'$ and held to the body of the piston by screws $e$.

When it is desired to fill the device with grease, the cylinder A is unscrewed from the cap or cover $b$ and is pulled off of the inner cylinder B, thereby exposing the opening in the side thereof. The piston D is then moved to the cap end of the cylinder B by turning the crank handle, after which the solid or semi-solid lubricant is introduced into said cylinder, which when filled is entered into the cylinder A; the two being screwed together as above indicated. Thereafter the turning of the crank handle will result in a turning of the screw C and inasmuch as the piston D is prevented from turning in the cylinder B by reason of its projecting portion d' which also prevents the passage of the grease by it, the grease is forced out of said cylinder.

I claim:—

1. A grease gun consisting of a cylinder having in its side an opening for the introduction of material and provided with an outlet, a piston in the cylinder having means to prevent the escape of material past its edge through the opening in said cylinder, means for causing the piston to move longitudinally of the cylinder, and a cover for said opening in the cylinder, said cover being mounted on the cylinder so as to be free to rotate when it is applied to or removed therefrom.

2. The combination of two cylinders constructed to fit together, one cylinder having an elongated side opening extending the greater part of its length and normally closed by the other cylinder, a nozzle for one of the cylinders, and means including a piston extending into the side opening of said cylinder for expelling the material in the cylinders through said nozzle.

3. The combination in a grease gun of two cylinders fitting together, of which the inner one is provided with an elongated opening, a piston having a projection extending through the opening of the inner cylinder into engagement with the inner wall of the outer cylinder, means for causing said piston to move longitudinally through the cylinder, and a nozzle for the outer cylinder.

4. The combination of two cylinders capable of fitting together, one having a nozzle, and the other having a threaded cap for the reception of the first cylinder, the inner one of said cylinders having an elongated side opening, a screw extending axially of the cylinders, means for turning said screw, and a piston mounted on the screw and extending into the side opening of said inner cylinder.

5. The combination of two cylinders fitting together, the inner cylinder having a longitudinally extending side opening, a screw mounted in said cylinder, a piston mounted on the screw and having a removable portion provided with a projection fitting the opening in said inner cylinder, means for turning the screw, and a nozzle for one of said cylinders.

6. The combination of a cylinder having a nozzle and provided with a screw threaded portion, a second cylinder fitting the first and provided with a longitudinally extending opening in its side, a cap for said second cylinder having a threaded annular recess for the reception of the threaded portion of the first cylinder, a screw extending axially of the cylinders, a piston attached to the screw and extending into the opening in the inner cylinder so as to prevent the escape of material from one face to the other of said piston, and a handle for turning the screw.

7. The combination in a grease gun of two cylinders removably fitting one within the other; the inner cylinder having a longitudinally extending opening; a piston in said inner cylinder having a portion extending into the opening whereby revolution of said piston is prevented; a revoluble screw held from longitudinal movement and passing through said piston; with means for turning said screw to move the piston longitudinally within the cylinders.

In testimony whereof, I have signed my name to this specification, in the presence of two subscribing witnesses:

SAMUEL P. TOWNSEND.

Witnesses:
　WILLIAM T. SIGLER,
　WILLIAM PARROTT.